United States Patent
Schulz et al.

(10) Patent No.: US 6,645,608 B2
(45) Date of Patent: Nov. 11, 2003

(54) REFLECTION REDUCING COATING

(75) Inventors: Ulrike Schulz, Kunitz (DE); Norbert Kaiser, Jena (DE); Uwe Schallenberg, Jena (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 69 days.

(21) Appl. No.: 10/048,668

(22) PCT Filed: Jun. 28, 2001

(86) PCT No.: PCT/DE01/02501
§ 371 (c)(1),
(2), (4) Date: Feb. 22, 2002

(87) PCT Pub. No.: WO02/04374
PCT Pub. Date: Jan. 17, 2002

(65) Prior Publication Data
US 2002/0136877 A1 Sep. 26, 2002

(30) Foreign Application Priority Data
Jul. 10, 2000 (DE) .......................... 100 34 158

(51) Int. Cl.[7] .............................. B32B 7/02; B32B 17/03
(52) U.S. Cl. .............. 428/212; 428/428; 428/432; 428/699; 428/701; 428/702
(58) Field of Search ................ 428/426, 432, 428/428, 412, 446, 448, 689, 697, 699, 701, 702, 212

(56) References Cited

U.S. PATENT DOCUMENTS

| 4,798,994 | A | | 1/1989 | Rijpers et al. | |
|---|---|---|---|---|---|
| 5,337,191 | A | * | 8/1994 | Austin | 359/885 |
| 5,891,556 | A | * | 4/1999 | Anderson et al. | 428/216 |
| 6,074,730 | A | * | 6/2000 | Laird et al. | 428/212 |
| 2001/0031365 | A1 | * | 10/2001 | Anderson et al. | 428/432 |

* cited by examiner

*Primary Examiner*—Deborah Jones
*Assistant Examiner*—G. A. Blackwell-Rudasill
(74) *Attorney, Agent, or Firm*—Leydig Voit & Mayer, Ltd.

(57) ABSTRACT

The invention relates to a reflection reducing coating on a substrate which is formed from an alternating change layer system each having a lower and higher refractive index. In particular, the invention can be advantageously employed on surfaces of substrates such as optical elements and spectacle glasses, in particular. According to the object most different substrates are to be coated, and during the deposition of a reflection reducing coating an unacceptable temperature rise of the respective substrate is not to occur. With this, a coating is deposited in which the sum of the layer thicknesses of layers each having a higher refractive index is ≦5% of the total layer thickness of the coating, and the layers of the material having a higher refractive index within the layer sequence of the change layer system are uniformly distributed.

14 Claims, 5 Drawing Sheets

Diagrammatic structure of an abrasionproof anti_reflex layer system on PMMA (total layer thickness appr. 1.1 μm)

calculated reflection spectrum for an ABAR coating on a plastic substrate against air comprising 9 individual layers and a total thickness of 1100mm (see example 1)

calculated reflection spectra for ABAR layers of the visual spectral region having different total layer thicknesses (blue - 13 layers, violet - 15 layers, yellow - 17 layers)

calculated reflection spectrum for an ABAR coating on a plastic substrate against air in the NIR range comprising 9 individual layers and a total thickness of 1827nm (see example 2)

calculated reflection spectrum for an ABAR coating on a plastic substrate against air in the UV range comprising 9 individual layers and a total thickness of 1827nm

FIG. 5

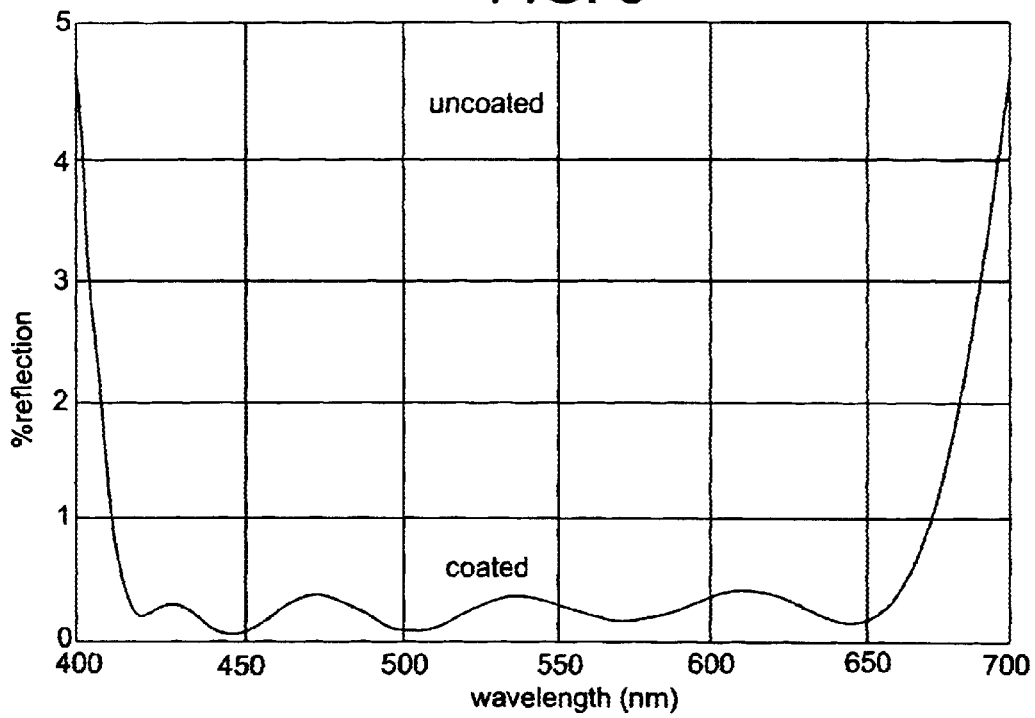

calculated reflection spectrum for an ABAR coating on a plastic substrate against air in the VIS range having a residual reflection <0,5 % comprising 9 individual layers and a total thickness of 771,5nm (see example 4)

FIG. 6

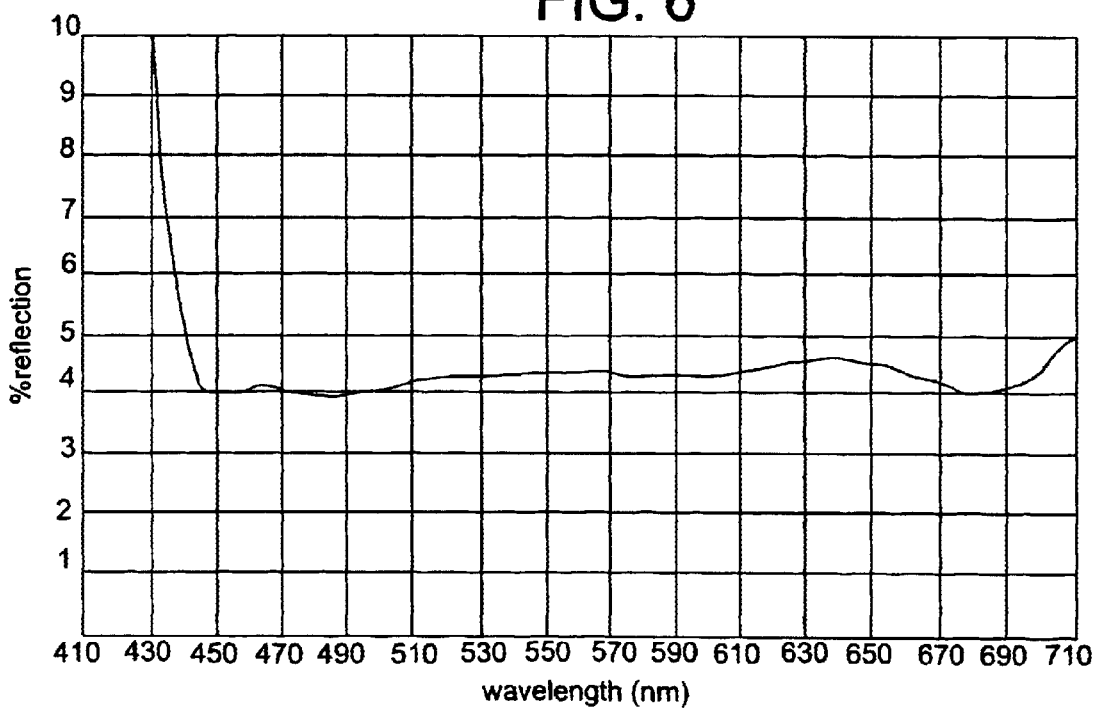

measured transmission type spectrum of a coating on a PMMA substrate (reflection of the uncoated back: 4%) performed with an ABAR layer system according to example 1 on one side Diagrammatic structure of an abrasionproof anti_reflex layer system on PMMA (total layer thickness appr. 1.1 μm)

REFLECTION REDUCING COATING

This application is the U.S. National Phase of international patent application PCT/DE01/02501, filed on Jun. 28, 2001, and claiming priority to German patent application number 100 34 158.6, filed Jul. 10, 2000, hereby incorporated by reference.

The invention relates to a reflection reducing coating. With the solution according to the invention the reflection of light impinging upon the surface of substrates can be effectively and largely decreased, which is desirable for many cases of application, in particular for many optical elements (lenses, windows and prisms etc.) or opto-electronic elements, and for spectacle glasses as well. The coating can be particularly advantageously employed for the reflectance decrease in the visual spectral range.

For a plurality of applications, and spectacle glasses are to be explicitly mentioned, it is also required to provide a respective "antireflex coating" having a high abrasion resistance.

In the past, synthetic material has also enforced as material for optical elements and spectacle glasses, in particular due to the manufacturing cost and the lower density in comparison with glasses.

Although the synthetic material has equivalent optical characteristics with respect to the glasses used until now, however, it provides a Substantially lower scratch resistance such that with the mechanical influences having an abrasive effect the surfaces become damaged and the optical performance is deteriorated.

For optical components, and in particular spectacle glasses abrasiveproof and reflection reducing surfaces are required which can only be achieved by means of the respective coatings.

In accordance with the International Standard ISO 9211-02, for example, such coatings have to meet a sufficient wiping resistance also during cleaning processes which are performed with cotton clothes or rubber.

In particular with the spectacle glasses hard layers having a thickness of several micrometers, and thereupon an additional reflection reducing coating are deposited.

Such hard layers can be manufactured by a layer of lacquer and the subsequent vacuum evaporation of a reflection reducing coating such as described by W. Köppen and E. Kampmeyer in DOZ 2(1995), pp. 22 to 26.

The generation of hard layers by means of plasma polymerization originates from J. Bötschi, F. Thieboud, and is mentioned in DOZ 10 (1992), pp. 26 to 27; and by D. Giessner in NOJ 5 (1995), pp. 62 to 64 with respect to the vacuum evaporation of such hard layers, wherein the publication last mentioned is a matter of organically modified quartz layers. Subsequently, with depositing such hard layers again it is necessary to deposit the reflection reducing cover layer by means of well-known CVD and PVD processes, respectively.

The same demands as with respect to other substrate materials are made in particular on thermoplastic polymers such as poly(methyl methacrylate), polycarbonate and such other synthetic materials, wherein up to now accordingly suitable coatings are obtained in a wet-chemical manner or by means of vacuum evaporation, and a combination of such coating methods, respectively. Thus, a wet-chemical layer with well-known coating methods is an additional time consuming and expensive manufacturing step which is separated from the procedure step of forming the reflection reducing layer. For precision optics having very irregularly formed and greatly curved surfaces, and with small sized optical elements such methods are not suitable. With a reflection reducing coating which has been deposited on a relatively thick, more abrasiveproof hard layer an additional waviness of the spectral reflection of the total layer system occurs due to interference action with different refractive indices of the substrate material and hard layer.

For broadband reflection reducing coatings which for example cover the wavelength range of the visual light, two to six individual layers are required. With the well-known change layer systems a temperature rise of the substrate temperatures can occur. Temperatures can be achieved which are above of critical softening temperatures (e.g. 80 to 110° C. with acrylates) of the substrate material. Then, the temperature rise substantially occurs by the vaporization of the layer material having a high refractive index.

Therefore, it is an object of the invention to provide a reflection reducing coating on a Substrate which can be deposited upon any substrates without occurring an unacceptable temperature rise during depositing.

This object preferably is achieved by the characterizing features of the present invention. Advantageous embodiments and further developments of the solution will be apparent from the description of the invention provided herein.

FIG. 5 illustrates the reflection performance in the wavelength range of 420 nm–670 nm according to Example 4.

FIG. 6 illustrates the measured transmission of a one sided coating of a layer system according to Example 1.

Figure 1:
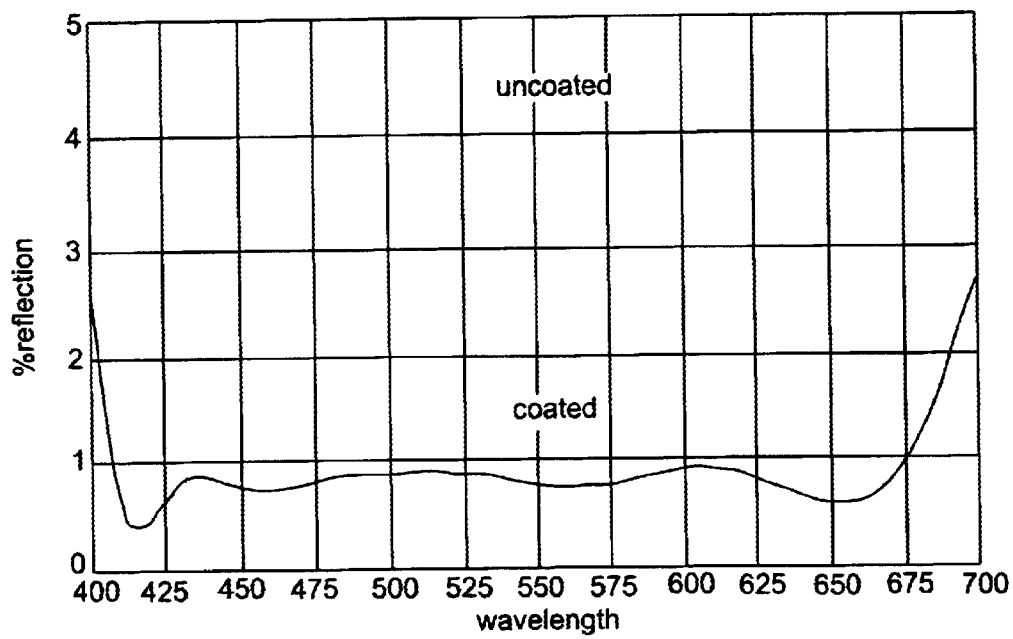
FIG. 1 illustrates the reflection performance in the wavelength range of 420 nm–670 nm according to Example 1.

The reflection reducing coating according to the invention is formed from an alternating change layer system of different layer materials each having a lower and a higher refractive index.

Then, the layer system will be configured such that the sum of the layer thicknesses of layers having a higher refractive index is $\leq 5\%$ of the total layer thickness of the coating. These layers are largely arranged in a uniformly distributed manner within the layer sequence of the change layer system. The uniform distribution and selection of thicknesses of the very thin layers having a higher refractive index occurs under the consideration of a predetermined wavelength range of the light as well as the optical characteristics of the layer and substrate materials.

The substrate is optically translucent preferably in the wavelength range in which the reflection is to be prevented. The translucence will be increased by means of the coating.

As a substrate material the most different synthetic materials as well such as e.g. polycarbonate and poly(methyl methacrylate) but temperature sensitive crystal materials can also be employed in addition to the commonly used optical glasses, wherein the coating can be deposited with methods for the substrate preparatory treatment and layer forming as are described in the DE 197 03 538 A1 and DE 197 52 889 C1. With the invention it is possible to exclude the undesired temperature rise of the substrate material.

The oxides or fluorides of the IVth and Vth class B elements can be preferably employed as layer materials for the individual layers of the change layer system having a higher refractive index. Such examples are $Ta_2O_5$, $ZrO_2$, $HfO_2$, $TiO_2$ or indium tin oxide (ITO), as well.

For the layers of materials having a respective lower refractive index $SiO_2$ and $MgF_2$ can be advantageously employed, wherein in particular $SiO_2$ has appropriate characteristics as a hard layer. Generally, the layer forming the boundary layer towards the air consists of material having a low refractive index.

The change layer system reducing the reflection can be formed from layers of merely two materials having the respective refractive indices. It is also possible to form such a change layer system from a plurality of such materials.

Such a change layer system can be matched to a predeterminable wavelength range of the light, wherein there are ways to provide matching for the wavelength range of the visual light, light in the near-infrared range and in the UV range as well.

For the change layer system at least five, preferably at least nine individual layers have to be employed, however, wherein the number of the layers can also substantially greater be selected.

The complete coating is allowed to have a total thickness between 500 and 2500 nm, preferably between 750 to 2000 nm, in the visual spectral range.

If required, the coating according to the invention can be deposited on a layer or coating already being present on the substrate surface.

When $SiO_2$, for example, as a hard layer component in a change layer system is employed for a coating which is formed according to the invention upon an optically translucent substrate then the layer system forms a unit which simultaneously comprises a high abrasion resistance and a high reflection reducing effect.

EXAMPLE 1

A coating for the visual spectral range in the wavelength range between $\lambda_1=420$ nm and $\lambda_2=670$ nm, e.g. is allowed to have the following layer design which has been calculated with the constant refractive indices of 1.5 for the substrate, 1.46 for the $SiO_2$ layers, 2.1 for the $Ta_2O_5$ layers and 1.0 for air. The reflective performance in the wavelength range is diagrammatically shown in FIG. 1.
PMMA Substrate
$1^{st}$ layer 210 nm $SiO_2$
$2^{nd}$ layer 4 nm $Ta_2O_5$
$3^{rd}$ layer 251 nm $SiO_2$
$4^{th}$ layer 6 nm $Ta_2O_5$
$5^{th}$ layer 248 nm $SiO_2$
$6^{th}$ layer 9 nm $Ta_2O_5$
$7^{th}$ layer 237 nm $SiO_2$
$8^{th}$ layer 16 nm $Ta_2O_5$
$9^{th}$ layer 119 nm $SiO_2$
Air The total thickness of the layer sequence is 1100 nm, wherein 1065 nm is allotted to the $SiO_2$ layers which in the sum have an effect as a hard layer, and merely 35 nm is allotted to the $Ta_2O_5$ layers required for the additional antireflex effect.

By installing after the fifth layer of another layer pairs of $SiO_2$ and $Ta_2O_5$ having a similiar thickness the total layer thickness and thus the mechanical stability of the layer system can be increased. By removing the layers 4 and 5, and 4 to 7, respectively, the layer design can be reduced without the antireflex effect getting lost.

Figure 2:
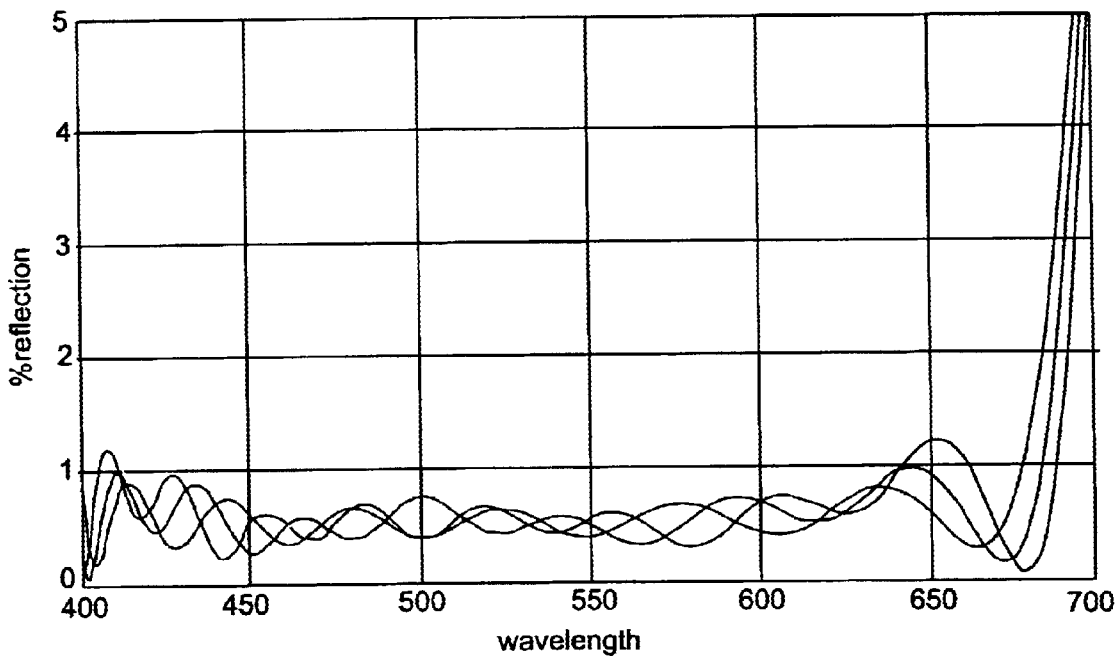
FIG. 2 illustrates the reflection performance of layer systems according to Example 1.

The respective reflection performance of such layer systems is illustrated in the diagram shown in FIG. 2.

Coatings from $SiO_2$ and $Ta_2O_5$ layers on synthetic materials are possible in the visual spectral range, e.g. with the following numbers of layers and total layer thicknesses:
7 layers: appr. 850 nm
9 layers: appr. 110 nm
11 layers: appr. 1300 nm
13 layers: appr. 1600 nm
15 layers: appr. 1850 nm
17 layers: appr. 2100 nm

EXAMPLE 2

In addition to coatings for the VIS range analogous layer sequences are also possible for the NIR and UV ranges which are abrasiveproof as well as have an effect in a reflection reducing manner, and which can be deposited upon the sensitive substrate materials mentioned. For the NIR wavelength range between $\lambda_1=700$ nm and $\lambda_2=1110$ nm the following layer sequence having nine individual layers is possible. It has been calculated with constant refractive indices of 1.5 for the substrate, 1.46 for the $SiO_2$ layers, 2.1 for the $Ta_2O_5$ layers and 1.0 for the air.
Synthetic Material Substrate
$1^{st}$ layer 349 nm $SiO_2$
$2^{nd}$ layer 6.5 nm $Ta_2O_5$
$3^{rd}$ layer 417 nm $SiO_2$
$4^{th}$ layer 10 nm $Ta_2O_5$
$5^{th}$ layer 412 nm $SiO_2$
$6^{th}$ layer 15 nm $Ta_2O_5$
$7^{th}$ layer 393.5 nm $SiO_2$
$8^{th}$ layer 26.5 nm $Ta_2O_5$
$9^{th}$ layer 197.5 nm $SiO_2$
Air The total thickness of the layer sequence is 1827 nm, wherein 1769 nm is allotted to the $SiO_2$ layers which in the sum have an effect as a hard layer, and merely 58 nm is allotted to the $Ta_2O_5$ layers required for the additional antireflex effect.

Figure 3:
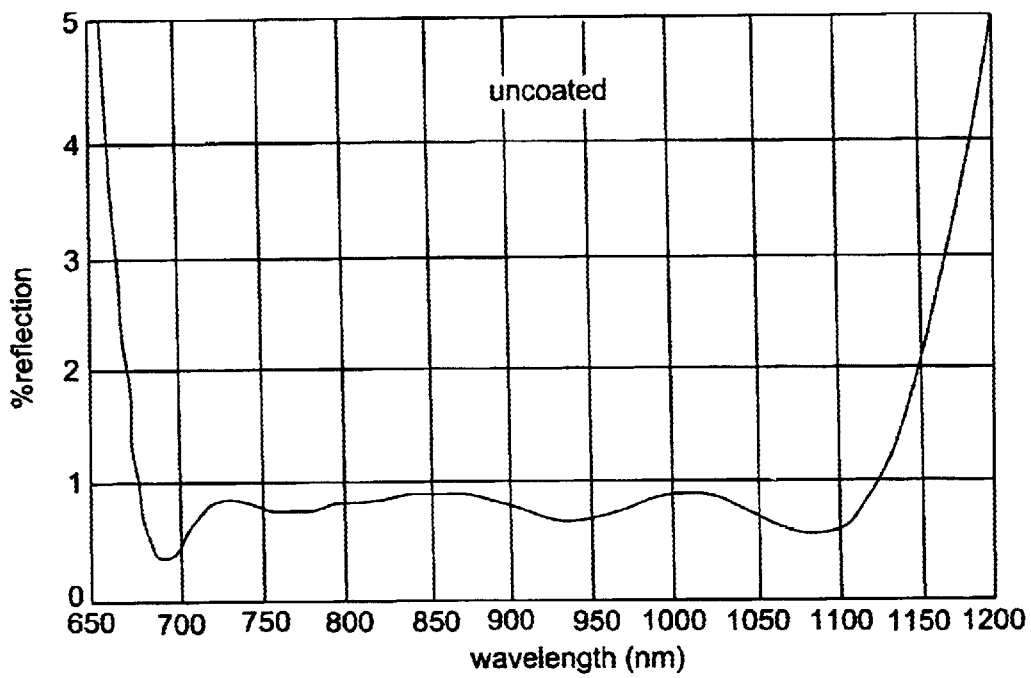
FIG. 3 illustrates the reflection performance in the wavelength range of 700 nm–1110 nm according to Example 2.

The reflection performance for this wavelength range has been illustrated in the diagram of FIG. 3.

EXAMPLE 3

Figure 4:
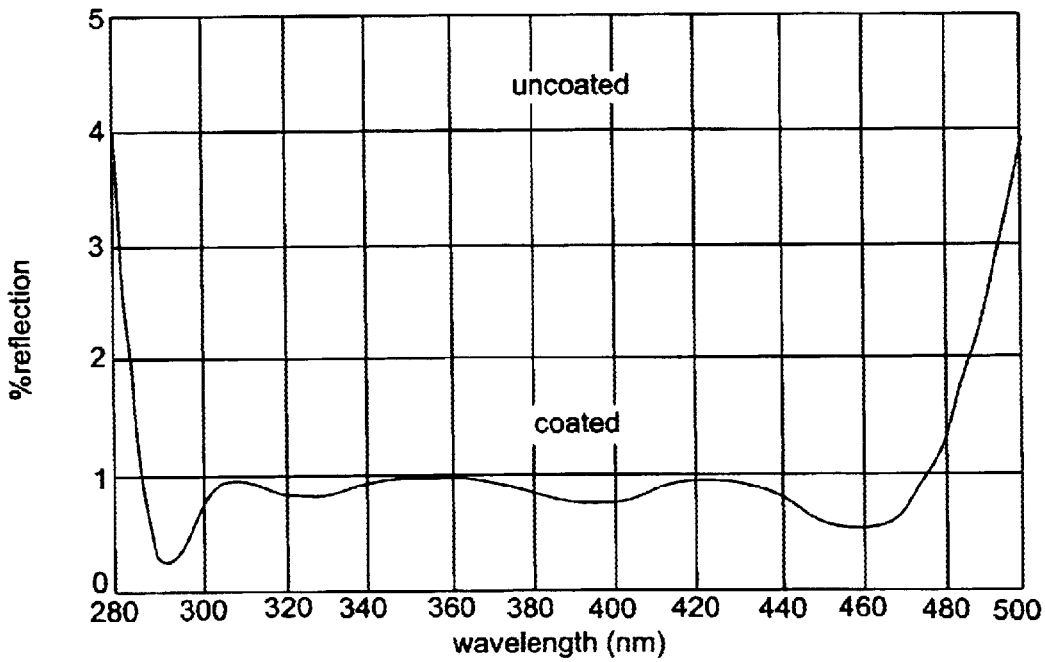
FIG. 4 illustrates the reflection performance in the wavelength range of 290 nm–470 nm according to Example 3.

For the UV wavelength range between $\lambda_1=290$ nm and $\lambda_2=470$ nm the following layer sequence including nine individual layers is possible. It has been calculated with constant refractive indices of 1.5 for the substrate, 1.46 for the $SiO_2$ layers, 2.1 for the $Ta_2O_5$ layers and 1.0 for the air.
Synthetic Material Substrate
$1^{st}$ layer 147 nm $SiO_2$
$2^{nd}$ layer 3 nm $Ta_2O_5$
$3^{rd}$ layer 176 nm $SiO_2$
$4^{th}$ layer 4.5 nm $Ta_2O_5$
$5^{th}$ layer 174 nm $SiO_2$
$6^{th}$ layer 6.5 nm $Ta_2O_5$
$7^{th}$ layer 166 nm $SiO_2$
$8^{th}$ layer 11 nm $Ta_2O_5$
$9^{th}$ layer 83.5 nm $SiO_2$
Air FIG. 4 shows the respective reflection performance in a diagrammatical manner.

The total thickness of the layer sequence is 771 nm, wherein 746.5 nm is allotted to the $SiO_2$ layers which in the sum have an effect as a hard layer, and merely 25 nm is allotted to the $Ta_2O_5$ layers required for the additional antireflex effect.

The quality of the antireflex effect depends on the refractive index of the layer material having a low refractive index. In addition to the thus far mentioned $SiO_2$ having a refractive index of 1.46, e.g. $MgF_2$ having a refractive index of 1.38 is also possible as material having a low refractive index. The layers having high refractive index as well may be composed of another material e.g. of $ZrO_2$ having a refractive index of 2.0. Using material with a refractive index being less tha $SiO_2$, e.g. with $MgF_2$, a value smaller than 0.5% can be achieved for the mean residual reflection in the wavelength range between $\lambda_1$ and $\lambda_2$.

EXAMPLE 4

For a coating for the visual spectral range within the wavelength range between $\lambda_1=420$ nm and $\lambda_2=670$ nm using the materials $MgF_2$ and $ZrO_2$, e.g., the following layer design is possible. It has been calculated with constant refractive indices of 1.5 for the substrate, 1.38 for the $MgF_2$ layers, 2.0 for the $ZrO_2$ layers and 1.0 for the air. The reflective performance is shown in FIG. 5.
Synthetic Material Substrate
$1^{st}$ layer 222 nm $MgF_2$
$2^{nd}$ layer 7 nm $ZrO_2$
$3^{rd}$ layer 256 nm $MgF_2$
$4^{th}$ layer 10 nm $ZrO_2$
$5^{th}$ layer 255 nm $MgF_2$
$6^{th}$ layer 13 nm $ZrO_2$
$7^{th}$ layer 245 nm $MgF_2$
$8^{th}$ layer 20.5 nm $ZrO_2$
$9^{th}$ layer 121 nm $MgF_2$
Air The total thickness of the layer sequence is 1149.5 nm, wherein 1099 nm is allotted to the $MgF_2$ layers, and 50.5 nm is allotted to the $ZrO_2$ layers required for the additional antireflex effect.

However, this layer sequence, and the material $MgF_2$ having a low refractive index the employed, only show the substantial antireflex effect since a hard layer of $MgF_2$ is generally not possible. However, the material having a high refractive index is quite allowed to vary and to be deposited on the outside in a more abrasiveproof coating having a respective refractive index. Then, in combination with $SiO_2$ as a hard layer $TiO_2$ and ITO (indium tin oxide) are possible, e.g. for the UV range, $ZrO_2$ in the VIS and NIR ranges, $Ta_2O_5$ apart from already mentioned $HfO_2$ as well.

The low total material thickness being below 1/20 of the total thickness of the layer sequence is substantially then with respect to the use of the material having a high refractive index wherein it is assured that with manufacturing the coating a minimum heat load of the synthetic material substrate occurs. With the use of indium tin oxide (ITO) the coating is allowed to have an additional antistatic effect.

EXAMPLE 5

An example of application is to coat spectacle glasses and optical windows as well made of translucent synthetic materials (polycarbonate or PMMA), e.g. for displays of measuring instruments, and in vehicles which should comprise an abrasion resistance according to ISO 9211-02-04 (rubber test, 40 strokes having a force of 10 N).

Prior to the substantial layer deposition, the substrates to be coated are bombarded for 30 seconds in a coating plant with argon ions having an energy of appr. 100 eV, and a current density of appr. 0.1 $mA/cm^2$.

If substrates of PMMA are concerned this preparatory treatment is substituted with a Surface modification of poly(methyl methacrylate) which is described in detail in DE 197 03 538 A1 wherein reference to its disclosure is made in a full scope.

Then, to increase the adhesion performance and stability of the coating a vaccum plasma treatment is performed prior to the deposition of the coating. During the plasma threatment oxygen and a gas containing water is supplied. It should be preferably kept an equivalent fraction of water which corresponds to a relative air humidity of at least 40% Thereby, the substrate material will be ablated on the surface, and in parallel to this a chemical reaction is initiated in which the surface of the substrate will be changed under forming a polymer layer. The polymer layer formed on the surface of the substrate clearly differs from the untreated material with respect to its chemical composition, and therefore with its characteristics. This superficial polymer material comprises a particularly high fraction of methylene and hydroxyl groupes. With PMMA as a Substrate, the characteristic C—O and C=O groups are decomposed during this preparatory treatment modifying the surface.

For the manufacture of the coating layers of $SiO_2$ and $Ta_2O_5$ are alternately deposited wherein the growing layer is bombarded with Ar ions having an energy of 80 eV ($SiO_2$) and 120 eV ($Ta_2O_5$), and having a current density of appr. 0.1 $mA/cm^2$. By means of the deposition of the layer system indicated in the example 1, the reflection of a coated surface in the visual spectral range of 420 nm to 670 nm is reduced to $\leq 1\%$. The translucency for visual light (transmission) is increased from 92% to >98% by means of a two sided coating. The coating method including the treatment with argon ions is completely described in DE 197 52 889 C1.

The coating proves successful in the abrasion test according to ISO 9211-02-04 without any defect formation as well as in an abrasion test performed with steel wool. Thus, the scratch resistance has been substantially improved with respect to that of the uncoated substrate. FIG. 6 shows the measured transmission with one sided coating of a layer system manufactured in this manner.

EXAMPLE 6

A reflection reducing coating from an alternating change layer system consisting of individual layers which are formed of $SiO_2$ and $Ta_2O_5$ has been deposited on a Substrate of a cyclo olefin polymer or a cyclo olefin copolymer as they are commercially available under the trade names "Zeonex" and "Topas". This coating altogether consists of 27 individual layers, and thus a high mechanical stability can be achieved.

With the alternate formation of the individual layers in the vacuum, an ion aided method can be advantageously performed wherein the respective layer is bombarded with argon ions. With respect to an $SiO_2$ layer it can be advantageously operated with an energy of 80 eV, and with respect to a $Ta_2O_5$ layer it can be advantageously operated with an energy of 120 eV, and a current density of appr. 0.1 $mA/cm^2$, respectively.

Although very thin layers of $Ta_2O_5$ have been formed which comprise a high refractive index such a coating is insensitive to systematic errors of layer thickness, and a higher proper meeting of layer thicknesses will not be claimed.

The coating withstands the abrasion test according to ISO 9211-02-04 without any formation of defects as well as an abrasion test with steel wool. The scratch resistance is equivalent to a pure $SiO_2$ layer having the same thickness.

A substrate with such a coating has a very good climate resistance, and fissuring or the ablation of the coating could not be observed at temperatures between −35° C. and +100° C. such that the climate resistance is clearly higher than that of pure individual $SiO_2$ layers or other well-known reflection reducing layers or layer systems.

Figure 7:
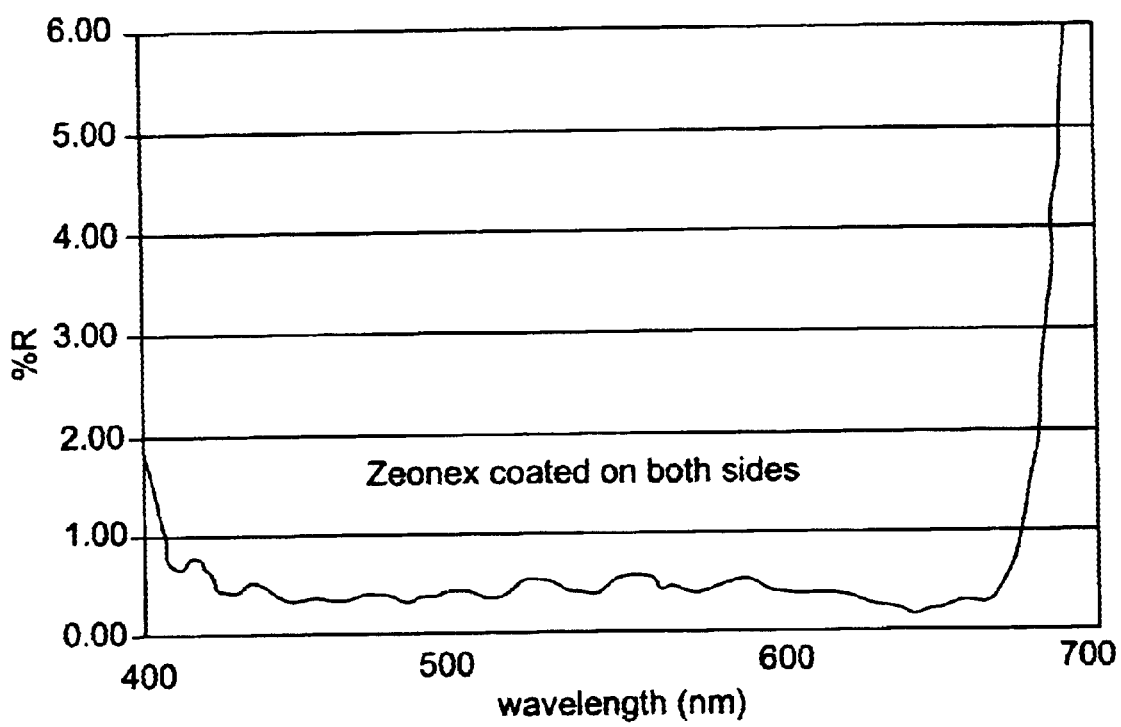
FIG. 7 illustrates the reflection performance of a two sided coated cycloolefin polymer.

With respect to this example, the following structure was selected for the reflection reducing coating:

Cycloolefin Polymer or Cycloolefin Copolymer Substrate
$1^{st}$ layer 34 nm $SiO_2$
$2^{nd}$ layer 3 nm $Ta_2O_5$
$3^{rd}$ layer 236 nm $SiO_2$
$4^{th}$ layer 2 nm $Ta_2O_5$
$5^{th}$ layer 254 nm $SiO_2$
$6^{th}$ layer 2 nm $Ta_2O_5$
$7^{th}$ layer 255 nm $SiO_2$
$8^{th}$ layer 3 nm $Ta_2O_5$
$9^{th}$ layer 255 nm $SiO_2$
$10^{th}$ layer 3 nm $Ta_2O_5$
$11^{th}$ layer 254 nm $SiO_2$
$12^{th}$ layer 4 nm $Ta_2O_5$
$13^{th}$ layer 254 nm $SiO_2$
$14^{th}$ layer 4 nm $Ta_2O_5$
$15^{th}$ layer 253 nm $SiO_2$
$16^{th}$ layer 4 nm $Ta_2O_5$
$17^{th}$ layer 253 nm $SiO_2$
$18^{th}$ layer 4 nm $Ta_2O_5$
$19^{th}$ layer 254 nm $SiO_2$
$20^{th}$ layer 3 nm $Ta_2O_5$
$21^{th}$ layer 424 nm $SiO_2$
$22^{th}$ layer 5 nm $Ta_2O_5$
$23^{th}$ layer 225 nm $SiO_2$
$24^{th}$ layer 30 nm $Ta_2O_5$
$25^{th}$ layer 23 nm $SiO_2$
$26^{th}$ layer 56 nm $Ta_2O_5$
$27^{th}$ layer 92 nm $SiO_2$
Air In FIG. 7 the reflection performance of a two sided coated cycloolefin polymer having the trade name "Zeonex" is illustrated.

With the graphical representation it will be appreciated that the reflection within the visual spectral range of light that is with wavelengths between 420 nm to 670 nm can be uniformly kept below 0.5%. Simultaneously, the translucency for the visual light (transmission) can be increased from 92% to >98% such that very good optical characteristics are ensured.

Figure 8:
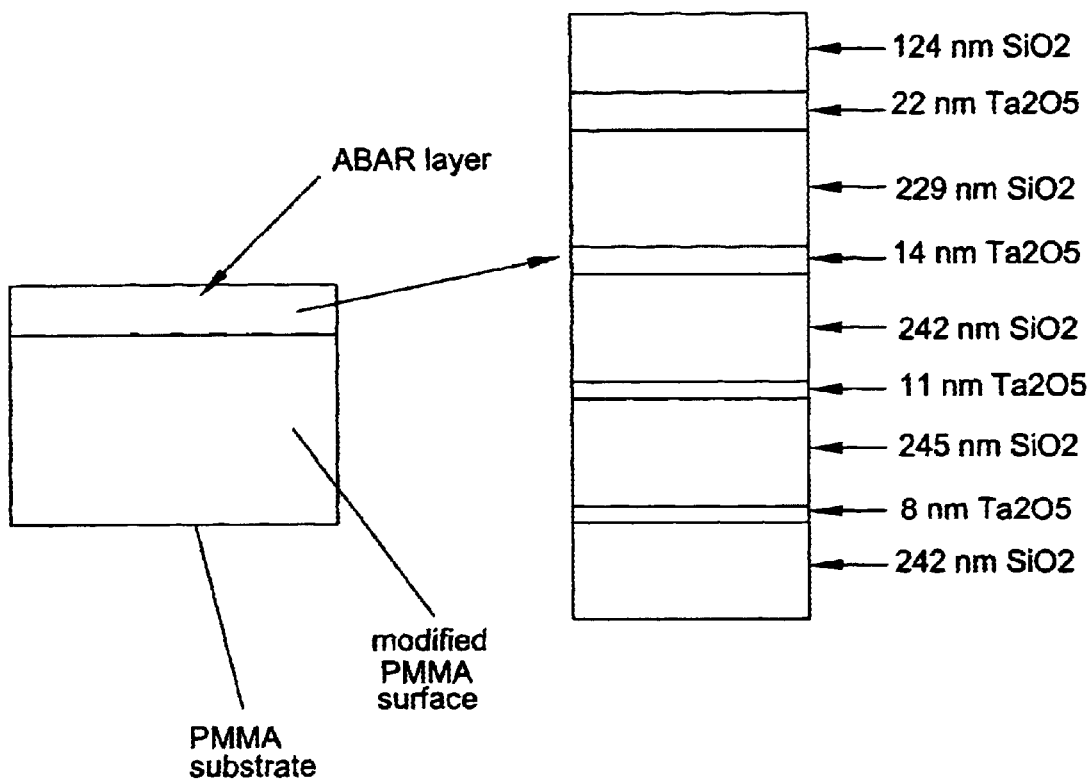
FIG. 8 shows the structure of a layer system according the present invention.

FIG. 8 shows the structure of a layer system in a pictorial schematic.

What is claimed is:

1. A reflection reducing coating on a substrate which is formed from an alternating change layer system of different layer materials each having a lower and higher refractive index, wherein the sum of the layer thicknesses of layers having a higher refractive index is ≦5% of the total layer thickness of the coating, and said layers of the material having a higher refractive index within the layer sequence of said change layer system are uniformly distributed.

2. A reflection reducing coating according to claim 1, wherein said coating is deposited on an optically translucent substrate.

3. A reflection reducing coating according to claim 1, wherein said substrate consists of a synthetic material or a temperature sensitive crystal material.

4. A reflection reducing coating according to claim 1, wherein said layer material having a higher refractive index is selected from oxides or fluorides of the IVth and Vth class B elements.

5. A reflection reducing coating according to claim 4, wherein said layer material for the layers having a higher refractive index are $Ta_2O_5$, $ZrO_2$, $HfO_2$, $TiO_2$ or indium tin oxide.

6. A reflection reducing coating according to claim 1, wherein said $SiO_2$ is a layer material for said layers having a lower refractive index.

7. A reflection reducing coating according to claim 1, wherein said $MgF_2$ is a layer material for the layers having a lower refractive index.

8. A reflection reducing coating according to claim 1, wherein said layer forming the boundary layer towards the air is formed from a material having a lower refractive index.

9. A reflection reducing coating according to claim 1, wherein layers of different materials having a higher refractive index are arranged in said layer system.

10. A reflection reducing coating according to claim 1, wherein said layer system is matched to a predeterminable wavelength range of light.

11. A reflection reducing coating according to claim 1, wherein at least five individual layers form said layer system.

12. A reflection reducing coating according to claim 1, wherein said coating has a total thickness between 500 and 2500 nm.

13. A reflection reducing coating according to claim 1, wherein said substrate is an optical or opto-electronic element.

14. A reflection reducing coating according to claim 1, wherein said substrate is a spectacle glass.

* * * * *